United States Patent [19]

Bass et al.

[11] 3,858,124
[45] Dec. 31, 1974

[54] ORGAN MONOCRYSTALLINE LIGHT WAVELENGTH CHANGING ELEMENT

[75] Inventors: Michael Bass, Lexington; Dominic P. Bua, Saugus, both of Mass.

[73] Assignee: Raytheon Company, Lexington, Mass.

[22] Filed: June 12, 1972

[21] Appl. No.: 261,852

Related U.S. Application Data

[63] Continuation of Ser. No. 1,164, Jan. 7, 1970, abandoned.

[52] U.S. Cl. ......... 332/7.51, 350/160 R, 252/301.3, 331/94.5
[51] Int. Cl. ............................................. H01s 3/10
[58] Field of Search .......... 332/7.51; 350/160, 161; 252/301.3; 260/343.2 R; 331/94.5

[56] References Cited
UNITED STATES PATENTS

| | | | |
|---|---|---|---|
| 3,234,475 | 2/1966 | Giordmaine et al. | 330/4.6 |
| 3,317,266 | 5/1967 | Heller et al. | 350/160 |
| 3,551,026 | 12/1970 | Heilmer | 350/150 |
| 3,582,814 | 6/1971 | Duguay et al. | 331/94.5 |
| 3,611,231 | 10/1971 | Burke | 350/160 |

OTHER PUBLICATIONS

Kurtz et al., "A Powder Technique for The Evaluation of Nonlinear Optical Materials," 7/68, pp. 3798–3813, J.A.P., Vol. 39, No. 8.

Bass, "Optical 2nd Harmonic Generation in Crystals of Organic Dyes," 12/15/69, pp. 393–396, A.P.L., Vol. 15, No. 12.

Derkocheva, "Appearance of 2nd Harmonics of...in dye powders," 70, pp. 469–472, Pis'MA Zh. Rksp. Tror. F18, 11(10) (Russian).

Gull, "Lowest Triplet State of Discoumaral," 1969, pp. 139–140, Photochem. Photobiol., 10(2).

*Primary Examiner*—Maynard R. Wilbur
*Assistant Examiner*—N. Moskowitz
*Attorney, Agent, or Firm*—Joseph D. Pannone; Milton D. Bartlett; David M. Warren

[57] ABSTRACT

An organic monocrystalline light wavelength changing element for converting coherent light in the infra-red region to coherent light in the green region, the monocrystalline element being selected from at least one of a family of certain coumarin dyes or quinine sulfate.

10 Claims, 5 Drawing Figures

WAVELENGTH SHIFTING DEVICE

WAVELENGTH SHIFTING DEVICE

7 DIETHYLAMINO-4 METHYL COUMARIN

7 HYDROX COUMARIN

COUMARIN

INVENTORS
MICHAEL BASS
DOMINIC P. BUA

BY Robert Bruce Brodie

ATTORNEY

FIG. 3

RESISTANCE TO SURFACE DAMAGE FOR SEVERAL NONLINEAR MATERIALS

| MATERIAL | $P_\infty \left(\dfrac{MW}{cm^2}\right)$ |
|---|---|
| POTASSIUM DIHYDROGEN PHOSPHATE (KDP) | >400 |
| AMMONIUM DIHYDROGEN PHOSPHATE (ADP) | >400 |
| 7-DIETHYLAMINO-4-METHYLCOUMARIN | 400 |
| COUMARIN | 10 |
| $Ba_2NaNb_5O_{15}$ | 10 |
| $LiNbO_3$ | 6 |

ORGAN MONOCRYSTALLINE LIGHT WAVELENGTH CHANGING ELEMENT

This is a continuation of application Ser. No. 1,164 filed Jan. 7, 1970 and now abandoned.

BACKGROUND OF THE INVENTION

This invention relates to light wavelength conversion devices and, more particularly, to conversion devices used with lasers in the infra-red portion of the spectrum.

In the prior art, monocrystalline forms of potassium dihydrogen phosphate (KDP), ammonium dihydrogen phosphate (ADP), barium sodium niobate (BaNaNbO$_3$), and lithium niobate (LiNbO$_3$) were used as coherent light phase modulators and for generating higher frequency harmonics. Monocrystalline KDP and ADP, while offering greater resistance to optical irradiation induced surface damage due to laser beam bombardment, do not exhibit large optical non-linearities. This rendered these crystals unsuitable for higher harmonic frequency generation or conversion. In contrast, BaNbO$_3$ and LiNbO$_3$ showed large non-linearities but, unfortunately, a low resistance to optical damage. In this regard, the term "resistance to optical damage" means the number of times the surface of a crystalline material can be bombarded with laser radiation of a given power density in watts per unit area before the subject crystal shows signs of opacity. Thus, a crystal showing high resistance would require a larger number of shots than a crystal of low resistance for the same power density of the incident laser beams.

All of the above-mentioned crystals vary their refractive index when an electric field is applied to them. Thus, such crystals find employment as electro-optic phase modulators.

These crystals have also been used both in the form of powdered samples and large single crystals. It has been recognized that large single crystalline form is to be preferred because large electro-optical and non-linear effects can be obtained through their use.

It is, accordingly, an object of this invention to devise a wavelength changing element preferably in large single crystal form suitable for use with high power light. It is a related object that such element exhibit a high resistance to optical irradiation induced surface damage and exhibit large optical non-linear coefficients. Furthermore, such element should permit its refractive index to be altered upon application of a suitable electric field. Lastly, it is desired that this element be useful for both light modulation and higher harmonic frequency generating purposes.

SUMMARY OF THE INVENTION

The foregoing objects of this invention are satisfied in an embodiment in which a monocrystalline material formed from at least one of the group of materials consisting of coumarin, 7-dimethylamino - 4-methylcoumarin, 7-hydroxycoumarin, and quinine sulfate, is illuminated with coherent light in the infra-red region. It was unexpectedly discovered that materials in the group generate higher frequency harmonics, such as coherent green light of 0.53 micron wavelength, when illuminated by coherent light at 1.06 micron wavelengths from Nd:YAG laser. Advantageously, the materials exhibited little, if any, optical irradiation induced surface damage due to the incident beam.

Since these materials exhibit second order optical non-linearities, their symmetry properties are such that they can be embodied in the form of an optical modulator. When so embodied the amplitude or phase of the coherent light introduced into the crystal could be varied by impressing an interacting electric field through the crystal.

BRIEF DESCRIPTION OF THE DRAWINGS

FIG. 3 is a comparative table showing resistance to surface damage for several non-linear materials.

DESCRIPTION OF THE PREFERRED EMBODIMENTS

Figure 1:
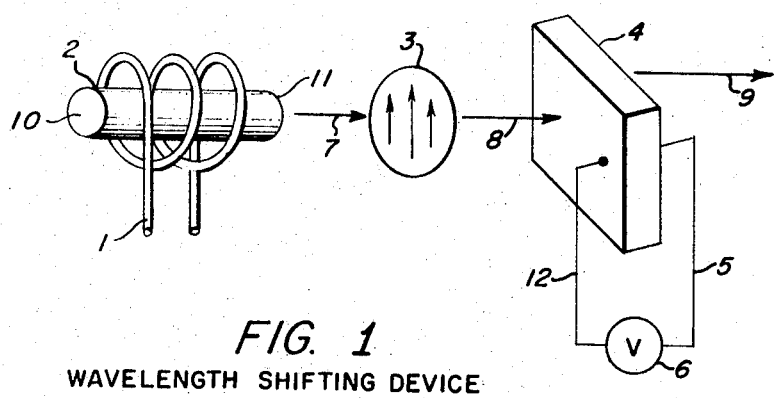
FIG. 1 shows a monocrystalline material formed from at least a selected coumarin or quinine sulfate embodied as an optical modulator.

Referring now to FIG. 1 of the drawings, there is shown solid state laser rod 2 comprising a suitable monocrystalline host lattice material such as YAG doped with selected rare earth ions such as neodymium Nd$^{+3}$. Pump energy is supplied by helical lamp 1 encompassing rod 2 and connected to an energy source (not shown). Ends 10 and 11 of rod 2 are ground and polished in the form of confocal spherical surfaces. Reflective layers (not shown) are deposited on ends 10 and 11, thereby forming an optical cavity resonator. Advantageously, the layer on end 10 is totally reflecting. The layer on end 11 has at least a portion of its surface which is only partially reflecting. This permits the escape of a beam of coherent radiation 7. The beam has a wavelength of 1.06 microns.

Lamp 1 is advantageously of the type which produces intense radiation of a broad band extending to 4000 Angstroms. In this regard, krypton or xenon lamps are considered useful to pump the laser rod.

A polarizer 3 may be interposed in the path of beam 7. Monocrystalline material 4 has impressed across it an electric field applied from voltage source 6 through conductors 5 and 12. Coherent light beam 8 illuminates one side of crystal 4. A coherent beam 9, for example, in the green light region emerges on the opposite side of crystal 4 having either its phase or amplitude modulated.

Preferably, crystal 4 is selected from at least one of the group of materials consisting of coumarin; 7-diethylamino - 4-methylcoumarin; 7-hydroxycoumarin; and quinine sulfate.

Crystal means 4 is preferably monocrystalline, forming a parallelopiped approximately 5 millimeters in length and 3 × 3 millimeters in cross section. Such a crystal may be grown by the vapor phase sublimation technique or grown by recrystallization from a suitable solvent. In the vapor phase sublimation technique, the material in powdered form is placed in a vacuum chamber having two temperature sources, i.e., hot and cold. The powdered material is placed at the hot point and vaporized. A condensed single crystal is placed at the cold point. The rate of crystallization is controlled by the thermal gradient between the vaporized material at the hot point and the condensed single crystal at the cold point. Generally, the higher the thermal gradient, the faster the transport of vapor to the condensed crystal.

The second technique requires growth as a function of recrystallizing the dissolved powder from a suitable solvent such as dimethyl sulfoxide, methylene chloride, or methyl alcohol. The material dissolved in the solvent is evaporated, with the solution being saturated at a higher temperature. The material is then slightly cooled. This cooling results in a super-saturated solution, with the excess solute recrystallizing out. It is to be observed that single crystal of the three forms of coumarin and quinine sulfate may be grown using one or the other crystal growth techniques.

Figure 2A:
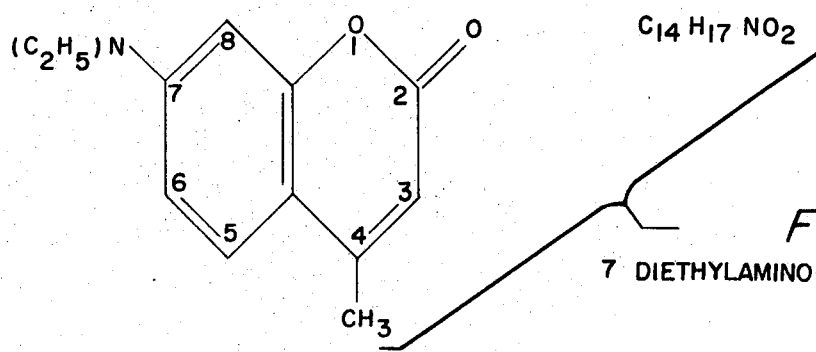
FIGS. 2A through 2C illustrate the molecular and structural formulas of the monocrystalline material forming a portion of the invention.
Figure 2B:
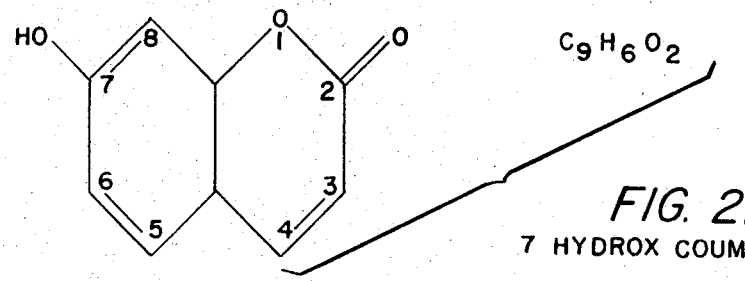
Figure 2C:
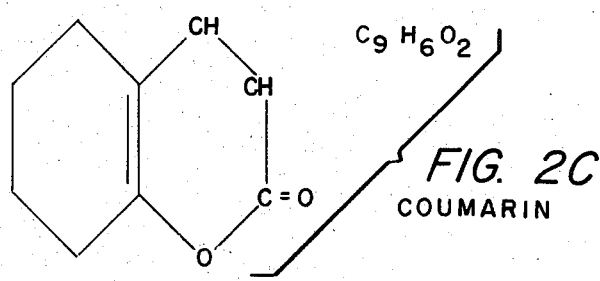

Referring now to FIGS. 2A through 2C, there are shown the molecular and structural formulas for each of the materials which shift coherent light in the infrared region to light in the green region. This property permits the crystal means 4 without an applied electric field to act as a frequency doubling device or as an optical modulator. In this latter context, it has been observed that as the electric field intensity is increased, the wavelength of beam 9 tends to decrease. Thus, if voltage source 6 represents a modulating signal, then the wavelength of beam 9 will tend to vary as an inverse function of voltage 6.

The coumarin materials are formed from the characteristic double benzene rings, with the second ring being heterocyclic with an oxygen occupying the carbon 1 position.

It has been observed that second harmonic generator coefficients in crystals grown as hereinabove described approximately equal the second harmonic generation coefficients of $LiNbO_3$. However, referring now to FIG. 3, there is shown a table of the test values of the minimum power density of a laser beam in milliwatts per $cm^2(MW/cm^2)$ after numerous beam irradiations of the crystal are required to cause optical surface damage. In the case of at least one of the coumarin materials, this value is advantageously 70 times greater than $LiNbO_3$.

It should be evident from the illustrative embodiments that have been set forth that the principles of this invention can be utilized in a wide variety of forms, especially where non-linear frequency response is desired. Among other embodiments which would enjoy an advantage utilizing the invention are those of frequency compression or expansion of optical waveshapes in laser communication and object location systems, and the resonant tuning of optical cavities. Accordingly, it is to be understood that these and other arrangements can be devised by one skilled in this art without departing from the spirit and scope of the invention.

What is claimed is:

1. In combination:
   optically permeable crystal means formed from at least one of the group of materials consisting of coumarin; 7-diethylamino - 4-methylcoumarin; 7-hydroxycoumarin; and quinine sulfate; and
   means for shifting the wavelength of coherent light comprising introducing said coherent light having a wavelength within the infra-red region into the crystal means.

2. The combination according to claim 1, wherein:
   the material forming the optically permeable crystal means is monocrystalline.

3. The combination according to claim 1, wherein:
   the material forming the optically permeable crystal means includes a powder sample.

4. A wavelength shifting device responsive to coherent light in the infra-red region comprising:
   solid monocrystalline material formed from at least one of the group of materials consisting of coumarin; 7-diethylamino - 4-methylcoumarin; 7-hydroxycoumarin; and quinine sulfate; and
   means for introducing substantially coherent light having a wavelength within the infra-red region into said material to shift the wavelength of said light.

5. A wavelength shifting device for generating coherent light in the visible green region in combination with a source of coherent light in the infra-red region illuminating said device, the device comprising:
   solid monocrystalline material formed from at least one of the group of materials consisting of coumarin; 7-hydroxycoumarin; 7-diethylamino - 4-methylcoumarin; and quinine sulfate; and
   means for introducing substantially coherent light from said source into said material to shift the wavelength of said light.

6. An optical modulator comprising:
   optically permeable crystal means formed from at least one of the group of materials consisting of coumarin; 7-diethylamino - 4-methylcoumarin; 7-hydroxycoumarin; and quinine sulfate; and
   means for introducing coherent light within the wavelength range from 1.05 microns to 1.10 microns into the crystal means.

7. An optical modulator according to claim 6, wherein:
   the material forming the optically permeable crystal means includes a monocrystalline element.

8. An optical modulator according to claim 6, wherein:
   the material forming the optically permeable crystal means includes a powder sample.

9. An optical modulator comprising:
   an optically permeable monocrystalline structure formed from at least one of the group of materials consisting of coumarin; 7-diethylamino - 4-methylcoumarin; 7-hydroxycoumarin; and quinine sulfate; and
   means for shifting the wavelength of a beam of coherent light comprising illuminating at least a portion of the monocrystalline structure surface with said coherent light within the wavelength range from 1.05 microns to 1.10 microns.

10. In combination:
    means for producing a beam of coherent light of a predetermined wavelength; and
    monocrystalline means exposed to said beam for producing a harmonic of said light, said monocrystalline means comprising at least one of the group of materials consisting of coumarin; 7-hydroxycoumarin; 7-diethylamino - 4-methylcoumarin; and quinine sulfate.

* * * * *